US009009659B2

(12) United States Patent
Johnson, Jr. et al.

(10) Patent No.: US 9,009,659 B2
(45) Date of Patent: Apr. 14, 2015

(54) METHOD AND SYSTEM FOR DISPLAYING CONTEXT-BASED COMPLETION VALUES IN AN INTEGRATED DEVELOPMENT ENVIRONMENT FOR ASSET MANAGEMENT SOFTWARE

(71) Applicant: Total Resource Management, Inc., Alexandria, VA (US)

(72) Inventors: Albert M. Johnson, Jr., Falls Church, VA (US); Andrew Joseph Mahen, Arlington, VA (US)

(73) Assignee: Total Resource Management, Inc., Alexandria, VA (US)

( * ) Notice: Subject to any disclaimer, the term of this patent is extended or adjusted under 35 U.S.C. 154(b) by 0 days.

(21) Appl. No.: 14/197,002

(22) Filed: Mar. 4, 2014

(65) Prior Publication Data

US 2014/0250424 A1    Sep. 4, 2014

Related U.S. Application Data

(60) Provisional application No. 61/772,353, filed on Mar. 4, 2013.

(51) Int. Cl.
*G06F 9/44* (2006.01)

(52) U.S. Cl.
CPC ....................... *G06F 8/33* (2013.01)

(58) Field of Classification Search
CPC ........................................................ G06F 8/33
USPC .................................................. 717/100–119
See application file for complete search history.

(56) References Cited

U.S. PATENT DOCUMENTS

| 6,560,639 | B1 * | 5/2003 | Dan et al. ...................... 709/218 |
| 8,418,147 | B1 * | 4/2013 | Odenwelder et al. ......... 717/128 |
| 8,561,012 | B1 * | 10/2013 | Holler et al. ................... 717/102 |
| 8,701,078 | B1 * | 4/2014 | Holler et al. ................... 717/101 |
| 8,739,047 | B1 * | 5/2014 | Holler et al. ................... 715/759 |
| 2002/0194263 | A1 * | 12/2002 | Murren et al. ................. 709/203 |
| 2003/0009433 | A1 * | 1/2003 | Murren et al. .................... 707/1 |

OTHER PUBLICATIONS

Halsall, F.; Grimsdale, R.L.; Shoja, G.C.; Lambert, J.E., "Development environment for the design and test of applications software for a distributed multiprocessor computer system," Computers and Digital Techniques, IEE Proceedings E, vol. 130, No. 1, pp. 25-30, Jan. 1983.*

(Continued)

*Primary Examiner* — Satish Rampuria

(74) *Attorney, Agent, or Firm* — Buchanan Ingersoll & Rooney PC

(57) ABSTRACT

A method includes: displaying an editor of an integrated development environment executed by a computing system; receiving an input command from a user; detecting existence or absence of text preceding a cursor position in the editor; identifying at least one completion attribute, the at least one attribute being based on content of text preceding the cursor position if existence of text is detected, or the editor if absence of text is detected; transmitting the identified at least one attribute to a server configured to execute asset management software; receiving a plurality of completion values from the server based on the identified at least one attribute; storing the received plurality of completion values; and displaying, for selection by the user, the plurality of completion values at the cursor position in the editor.

18 Claims, 5 Drawing Sheets

(56) References Cited

OTHER PUBLICATIONS

Wang Rui-Rong; Wang Le-Yu; Geng Chen-Ge; Zhou Hong, "The design of VPP software development environment," Instrumentation and Measurement Technology Conference, 2002. IMTC/2002. Proceedings of the 19th IEEE, vol. 1, pp. 403-408 vol. 1, 2002.*

Ki-Yong Ahn; Seonpil Kim; Jae-Moon Kim; Chong-Min Kyung, "Implementation of a flexible development platform for simultaneous support of software and hardware development flow," ASIC, 2005. ASICON 2005. 6th International Conference On, vol. 2, pp. 886-889, 24-0 Oct. 2005.*

* cited by examiner

FIG. 4A

Editor
Public class UserList {
  public static void main(String[] args) { —406
    —408
  }
}
402
404

FIG. 4B

Editor
Public class UserList {
  public static void main(String[] args) { —410
    System.
    Workorder.    —412
    Users.
  }
}
402
404
408

FIG. 4C

Editor
Public class UserList {
  public static void main(String[] args) {
    Users.|  —408
  }
}
402
404

FIG. 4D

Editor
Public class UserList {
  public static void main(String[] args) { —410
    Users.|
    Users.employeeID()
    Users.businessUnit(   —412
    Users.firstName()
  }
}
402
404

METHOD AND SYSTEM FOR DISPLAYING CONTEXT-BASED COMPLETION VALUES IN AN INTEGRATED DEVELOPMENT ENVIRONMENT FOR ASSET MANAGEMENT SOFTWARE

FIELD

The present disclosure relates to the displaying of completion values in an integrated development environment, specifically the retrieval of completion values from a database of an external asset management server based on completion attributes in the integrated development environment.

BACKGROUND

Enterprise asset management software is used by entities to operate, maintain, and manage enterprise assets. Many such software products, such as Maximo by IBM®, provide for the management of assets across multiple departments, locations, facilities, and business units for businesses and other entities. However, as asset management software is often designed to be useful for a broad range of entities and industries, such software may lack specific features that may be beneficial or necessary for certain entities. As a result, application programming interfaces may be available to interact with the software or its associated data, which may be used by an entity to develop additional functionality of the software.

However, due to the complicated nature of asset management software and the storage and maintenance of related assets, developing such functionality may be exceedingly difficult. In particular, the writing of scripts and programming code to interact with the asset management software may present a high level of difficulty to users. Thus, there is a perceived need for a solution to access context-based values and relationships in the database on the asset management software server for presentation to a user of a local system for inclusion in an integrated development environment.

SUMMARY

The present disclosure provides a description of systems and methods for the display of completion values in an integrated development environment.

A method includes: displaying, by a display device, an editor of an integrated development environment executed by a computing system; receiving, by an input device of the computing system, an input command from a user; detecting, by a processing device of the computing system, existence or absence of text preceding a cursor position in the displayed editor; identifying, by the processing device of the computing system, at least one completion attribute, wherein the at least one completion attribute is based on (i) content of text preceding the cursor position if existence of text is detected, or (ii) the displayed editor if absence of text is detected; transmitting, by a transmitting device of the computing system, the identified at least one completion attribute to a computing server configured to execute asset management software; receiving, by a receiving device of the computing system, a plurality of completion values from the computing server based on the identified at least one completion attribute; storing, in a memory of the computing system, the received plurality of completion values; and displaying, for selection by the user via the input device of the computing system, the plurality of completion values at the cursor position in the displayed editor.

A system includes a computing system including: a display device configured to display an editor of an integrated development environment executed by a computing system; an input device configured to receive an input command from a user; a processing device configured to detect existence or absence of text preceding a cursor position in the displayed editor, and identify at least one completion attribute, wherein the at least one completion attribute is based on (i) content of text preceding the cursor position if existence of text is detected, or (ii) the displayed editor if absence of text is detected; a transmitting device configured to transmit the identified at least one completion attribute to a computing server configured to execute asset management software; a receiving device configured to receive a plurality of completion values from the computing server based on the identified at least one completion attribute; and a memory configured to store the received plurality of completion values. The display device is further configured to display, for selection by the user via the input device of the computing system, the plurality of completion values at the cursor position in the displayed editor.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 4A-4D are diagrams illustrating a graphical user interface for the display of context-based completion values from an asset database of an asset management server based on completion attributes in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Displaying Context-Based Completion Values

Figure 1:
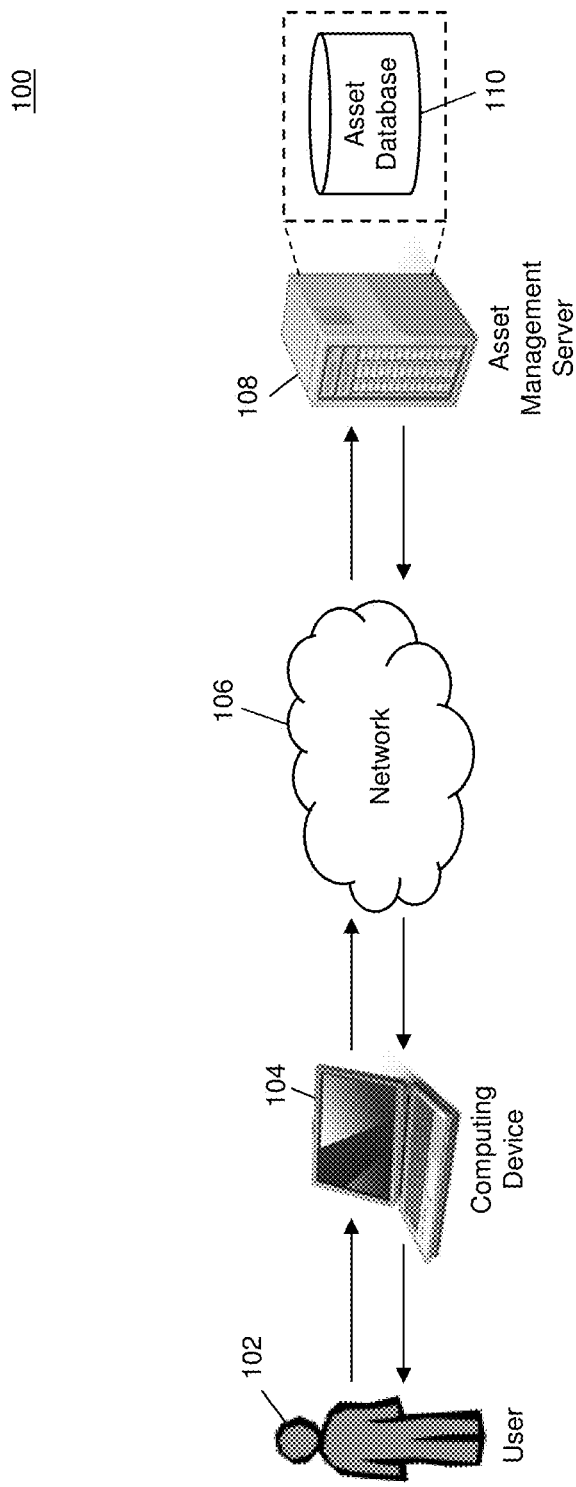
FIG. 1 is a high level architecture illustrating a system for displaying context-based completion values based on asset management software data in an integrated development environment in accordance with exemplary embodiments.

FIG. 1 illustrates a system 100 for the display of context-based completion values received from an asset database of an asset management server in an integrated development environment.

The system 100 may include a user 102. The user 102 may use a computing device 104 to access an integrated development environment. The computing device 104, discussed in more detail below, may be any type of computing device suitable for performing the functions disclosed herein such a desktop computer, laptop computer, notebook computer, tablet computer, smartphone, etc. The integrated development environment (IDE) may be executed by the computing device 104 and may include one or more editors configured to enable the user 102 to enter text, such as for a script or program code. The editor may be a part of, may utilize, may communicate via, or may otherwise be associated with an application programming interface (API) configured to interface with asset management software.

The computing device 104 may be connected to a network 106. The network 106 may be any type of network suitable for performing the functions as disclosed herein as will be apparent to persons having skill in the relevant art, such as a local area network, a wide area network, the Internet, etc. The system 100 may also include an asset management server 108. The asset management server 108 may be a computing server configured to store and execute asset management software. The asset management server 108 may include an asset database 110. The asset database 110 may be configured to store data, assets, and other information associated with the asset management software of the asset management server 108. In some embodiments, the asset database 110 may include at least one of: values, fields, relationships, methods, and attributes.

The computing device 104 may communicate with the asset management server 108 via the network 106. The editor in the IDE of the computing device 104 may access data stored in the asset database 110 via an API configured to communicate with the asset management server 108. As discussed in more detail below, the computing device 104 may retrieve context-based completion values stored in the asset database 110 of the asset management server 108 following a command by the user 102. The context-based completion values may be based on text included in the editor of the IDE executed by the computing device 104. One or more attributes may be identified based on the editor text and transmitted to the asset management server 108, which may identify a plurality of completion values in the asset database 110 based on the one or more attributes, and return the values to the computing device 104.

In some embodiments, the computing device 104 may cache the received completion values in a local memory, as discussed in more detail below. The computing device 104 may also store data to be included in the plurality of completion values, such as attributes and methods. The computing device 104 may display the plurality of completion values to the user 102. The user 102 may then select a completion value, which may be inserted into the editor at a current cursor position. In some embodiments, the plurality of completion values may be displayed via an overlay at or near the current cursor position.

By receiving completion values that are stored in the asset database 110, the computing device 104 may present the user 102 with useful information that may be unavailable in a traditional IDE. In addition, by providing completion values that are context-based, the computing device 104 may present the useful information to the user 102 with additional specificity, which may result in an even more effective interface. The computing device 104 may therefore provide for easier and more intuitive integration of an IDE with the asset management server 108, which may be further enhanced as part of a software program configured to further extend the capabilities of the asset management software, such as TRM Rules-Manager Studio.

Computing Device

Figure 2:
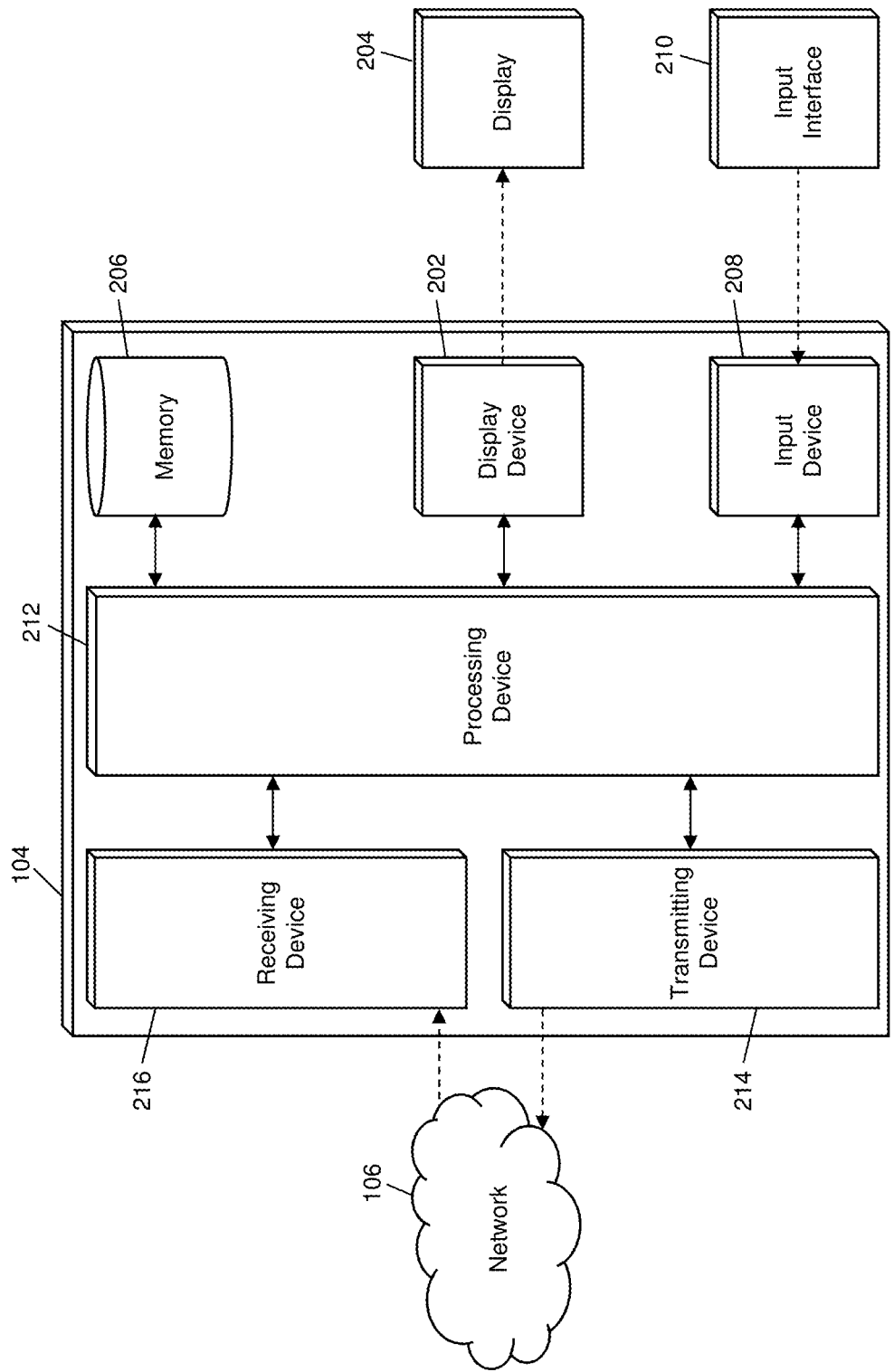
FIG. 2 is a block diagram illustrating the computing device of FIG. 1 for the retrieval of context-based completion values from an asset database of an asset management server and display thereof in accordance with exemplary embodiments.

FIG. 2 illustrates an embodiment of the computing device 104 of the system 100. It will be apparent to persons having skill in the relevant art that the embodiment of the computing device 104 illustrated in FIG. 2 is provided as illustration only and may not be exhaustive to all possible configurations of a computing device 104 suitable for performing the functions as discussed herein.

The computing device 104 may include a display device 202. The display device 202 may be configured to communicate and/or interface with a display 204 to display data to the user 102. The display 204 may be any type of display suitable for performing the functions disclosed herein, such as a liquid crystal display, light-emitting diode display, touch screen display, capacitive touch display, etc. The display device 202 may be configured to transmit data to the display that is stored in a memory 206 of the computing device 104.

The memory 206 may store data suitable for performing the functions disclosed herein, such as an IDE program configured to interface or communicate with the asset management server 108. The IDE may include one or more editors suitable for enabling the user 102 to create program scripts or otherwise input text, such as text used for input into or consideration by the asset management software executed by the asset management server 108. The display device 202 may be configured to display the data to the user 102, such as a selected editor and text included therein. The display device 202 may also display a cursor position, which may indicate a point of input for text or commands input by the user 102.

The computing device 104 may receive input from the user 102 via an input device 208. The user 102 may communicate with the input device 102 via an input interface 210 that is connected to or otherwise in communication with the input device 208. The input interface 210 may be any type of input suitable for performing the functions disclosed herein, such as a keyboard, mouse, touch screen, click wheel, scroll wheel, trackball, touch bad, input pad, microphone, camera, etc. In some embodiments, the input interface 210 and the display 204 may be combined, such as in a capacitive touch display. In some instances, the display 204 and/or the input interface 210 may be included in the computing device 104. In other instances, the display 204 and/or the input interface 210 may be external to the computing device 104.

The computing device 104 may further include a processing device 212. The processing device 212 may be a central processing unit (CPU) or other processor suitable for performing the functions disclosed herein as will be apparent to persons having skill in the relevant art. The processing device 212 may receive data associated with input by the user 102, such as via the input device 208. The processing device 212 may also be configured to execute program code stored in the memory 206, such as the IDE, and to transmit data to the display device 202 for display to the user 102 via the display 204. The processing device 212 may be further configured to identify one or more completion attributes based on the editor displayed to the user 102 and/or text included therein, as discussed in more detail below. Additional functions performed by the processing device 212 will be apparent to persons having skill in the relevant art and may also be discussed herein.

The computing device 104 may also include a transmitting device 214. The transmitting device 214 may be configured to transmit data over the network 106 via one or more suitable network protocols. The transmitting device 214 may transmit the one or more completion attributes to the asset management server 108 over the network 106. The computing device 104 may also include a receiving device 216. The receiving device 216 may be configured to receive data over the network 106 via one or more suitable network protocols. The receiving device 216 may receive a plurality of completion values from the asset management server 108 over the network 106. The plurality of completion values may be based on the one or more completion attributes.

The processing device 212 may be configured to communicate the received plurality of completion values to the display device 202, which may transmit the completion values to the display 204 for display to the user 102. In some embodiments, the completion values may also be stored in a cache of the memory 206. In such an embodiment, the completion values may be retrieved from the memory 206 upon identification of the corresponding one or more completion attributes in later instances, without the need to transmit a new request to the asset management server 108. In a further embodiment, the memory 206 may clear the cache after a predetermined period of time.

In some embodiments, the memory 206 may be configured to store method and/or attribute data. In such an embodiment, the processing device 212 may be configured to retrieve completion values based on the stored method and/or attribute data and the identified one or more attributes. The processing device 212 may be configured to include the retrieved completion values in the plurality of completion values received from the asset management server 108 for display to the user 102.

Process for Identifying and Displaying Context-Based Completion Values

Figure 3:
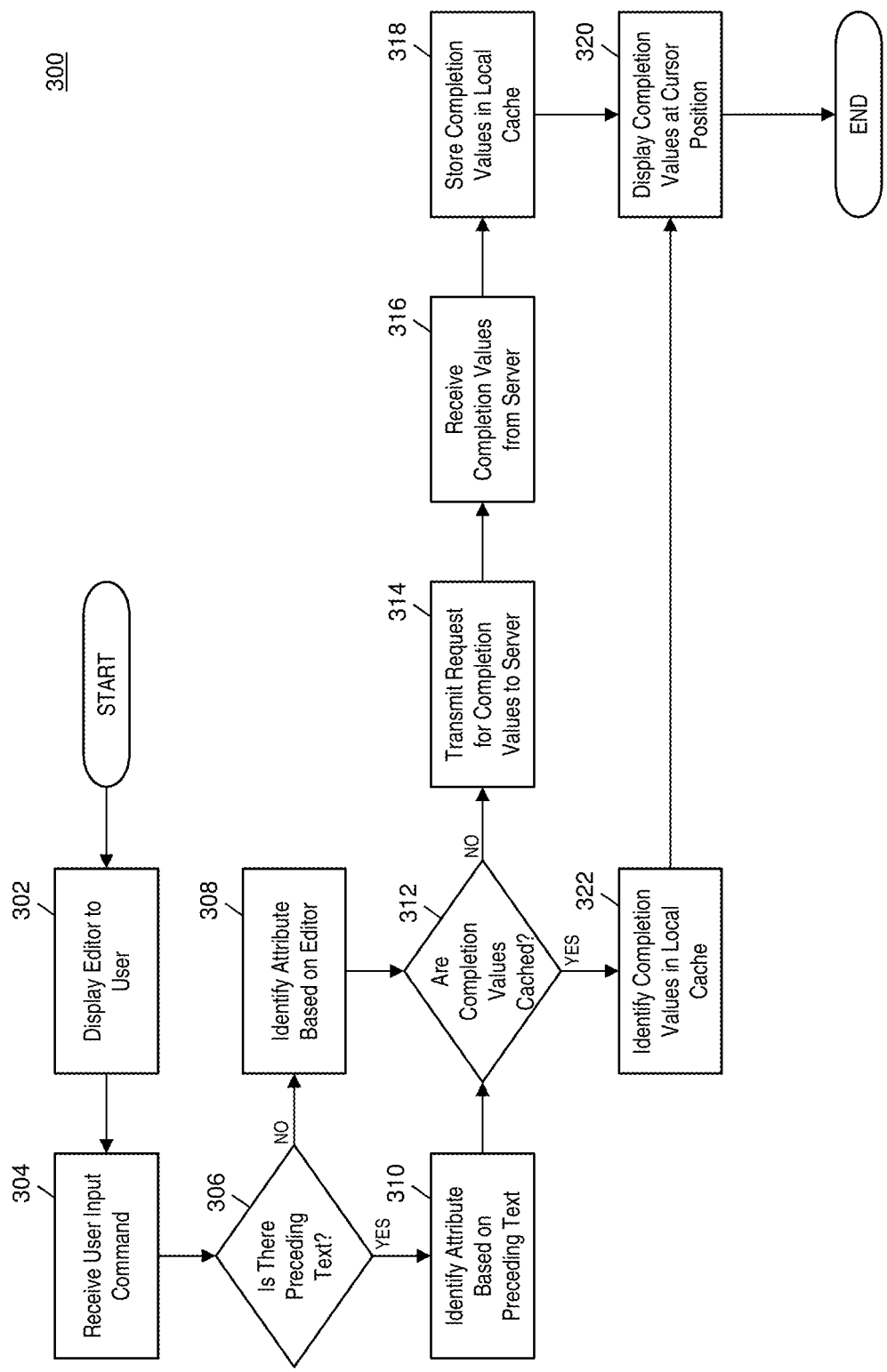
FIG. 3 is a flow diagram illustrating a process of the computing device of FIG. 2 for identifying context-based completion values for display in accordance with exemplary embodiments.

FIG. 3 illustrates a process 300 for the identification and display of completion values from an asset management server in an editor of an IDE based on the editor and/or text included therein.

In step 302, the display device 202 of the computing device 104 may display an editor to the user 102 via the display 204. The editor may be one of a plurality of editors included in an IDE configured to communicate and/or interface (e.g., via an API) with the asset management server 108 over the network 106. The displayed editor may include text and any other data suitable for performing the functions disclosed herein as will be apparent to persons having skill in the relevant art. The display device 202 may also display a cursor position in the editor, which may indicate a current position of input by the user 102.

In step 304, the input device 208 of the computing device 104 may receive an input command from the user 102 via the input interface 210. The input command may be a specific command or one of a plurality of specific commands configured to trigger the continuation of the process 300. For instance, in one example, the input command may be the inserting of a "." character in the editor by the user 102.

In step 306, the processing device 212 of the computing device 104 may identify the text included in the editor to detect if there is any text preceding the cursor position at the time the input command is received from the user 102. In some instances, the detection may be based on the received input command. For instance, the processing device 212 may presume that there is text preceding the cursor position if the input command is a "." character, but may presume that there is no text preceding the cursor position if the input command is a specific combination of keys on a keyboard. In other instances, the processing device 212 may identify the cursor position and the position of text inside the editor to determine if there is text preceding the cursor position.

If the processing device 212 determines that there is no text preceding the cursor position, then, in step 308, the processing device 212 may identify at least one completion attribute based on the editor currently being executed by the processing device 212 and displayed to the user 102. In one embodiment, the completion attribute may be the name or a descriptive element of the editor. If the processing device 212 determines that there is text preceding the cursor position, then, in step 310, the processing device 212 may identify at least one completion attribute based on the text preceding the cursor position. In one embodiment, the completion attribute may be a text word or value preceding the cursor position. In some embodiments, the identified at least one completion attribute may be based on partial execution and/or analysis of the text included in the editor. For instance, if the text included in the editor includes a program script, the script may be at least partially executed to identify one or more completion attributes.

One the completion attribute or attributes has been identified, then, in step 312, the processing device 212 may determine if associated completion values are cached in the memory 206. If completion values corresponding to the identified at least one completion attribute are not cached, then, in step 314, the transmitting device 214 of the computing server 104 may transmit a request for completion values to the asset management server 108 via the network 106. The asset management server 108 may then identify completion values stored in the asset database based on the at least one completion attribute. The completion values may include fields, values, relationships, methods, attributes, or other suitable data as will be apparent to persons having skill in the relevant art.

In step 316, the receiving device 216 of the computing server 104 may receive the plurality of completion values from the asset management server 108 over the network 106. In step 318, the processing device 212 may store the received completion values in the local cache of the memory 206. In step 320, the display device 202 may transmit the plurality of completion values to the display 204 for display to the user 102. In some embodiments, the completion values may be displayed at or near the cursor position, such as via an overlay or menu. An example interface for the display of completion values is illustrated in FIGS. 4A-4D and discussed below.

In instances where the completion values associated with the at least one completion attribute are cached in the memory 206, as determined in step 312, then, in step 322, the processing device 212 may identify the completion values as the desired plurality of completion values. The process 300 may then proceed to step 320, where the display device 202 may transmit the plurality of completion values to the display 204 for display to the user 102.

Graphical User Interface

FIGS. 4A-4D illustrate an exemplary graphical user interface of the IDE executed by the processing device 212 of the computing device 104 that is configured to display context-based completion values to the user 102. It will be apparent to persons having skill in the relevant art that the interface illustrated in FIGS. 4A-4D and discussed herein is an illustration only and that there may be alternative configurations of the interface suitable for performing the functions as disclosed herein.

FIG. 4A includes an editor window 402. The editor window 402 may be displayed by the display device 202 via the display 204 to the user for editing program scripts or otherwise inputting text that may be in communication with the asset management server 108, such as via an API. The editor window 402 may include a text area 404. The text area 404 may be an area for the display of text to the user 102. The text area 404 may also display text that is input by the user 102 as received by the input device 208 (e.g., via the input interface 210).

As illustrated in FIG. 4A, the text area 404 may include program code 406 input by the user 102. Methods and systems for receiving user input in a computing device 104 and display thereof in an area of a program stored in memory 206 and executed by a processing device 212 will be apparent to persons having skill in the relevant art. The text area 404 may also include a cursor position 408 among the program code 406 or other text. The cursor position 408 may indicate a location at which text input by the user 102 will be added to the text area 404.

As discussed above, the user 102 may input an input command into the input device 208 via the input interface 210. The input command may be transmitted to the processing device 212, which may identify the input command as triggering the process 300 discussed above. The processing device 212 may then, as discussed above, detect if there is text preceding the cursor position 408. As illustrated in FIG. 4A, the processing device 212 may not detect any text preceding the cursor position 408 and thus may identify at least one completion attribute based on the editor corresponding to the editor window 402. The processing device 212 may then identify (e.g., in a cache of the memory 206) or receive (e.g., from the asset management server 108) a plurality of completion values corresponding to the at least one completion attribute.

The display device 202 may then transmit the plurality of completion values to the display 204 for display to the user 102. As illustrated in FIG. 4B, the text area 404 may include an overlay 410 configured to display the plurality of completion values 412. In some embodiments, the overlay 410 may be located at or near the cursor position 408 and may be placed ahead (e.g., in front of) text included in the text area 404. The user 102 may then make a selection of a value in the overlay 410 via the input device 208. The processing device 212 may then insert the selected value in the text area 404 at the cursor position 408.

FIG. 4C illustrates an embodiment where there is text preceding the cursor position 408. As illustrated in FIG. 4C, the cursor position 408 may be preceded by "Users." In such an example, the typing of the "." character by the user 102 may be the input command that triggers the identification of the plurality of completion values. As illustrated in FIG. 4D, in such an instance, the plurality of completion values 412 may be based on the text preceding the cursor position 408. In the illustrated example, each of the completion values in the plurality of completion values are associated with the preceding text.

In an exemplary embodiment, the plurality of completion values are based on data in and/or included in the asset database 110 of the asset management server 108. In such an embodiment, the plurality of completion values 412 may change as data stored in the asset database 110 changes. For example, the plurality of completion values 412 may include database fields that may be changed during the course of business or may refer to business assets that may be added or deleted from the asset database 110. In such an instance, the user 102 may be presented with the most recent and most accurate data stored in the asset database 110, which may provide for a more effective development environment.

Exemplary Method for Displaying Context-Based Completion Values

Figure 5:
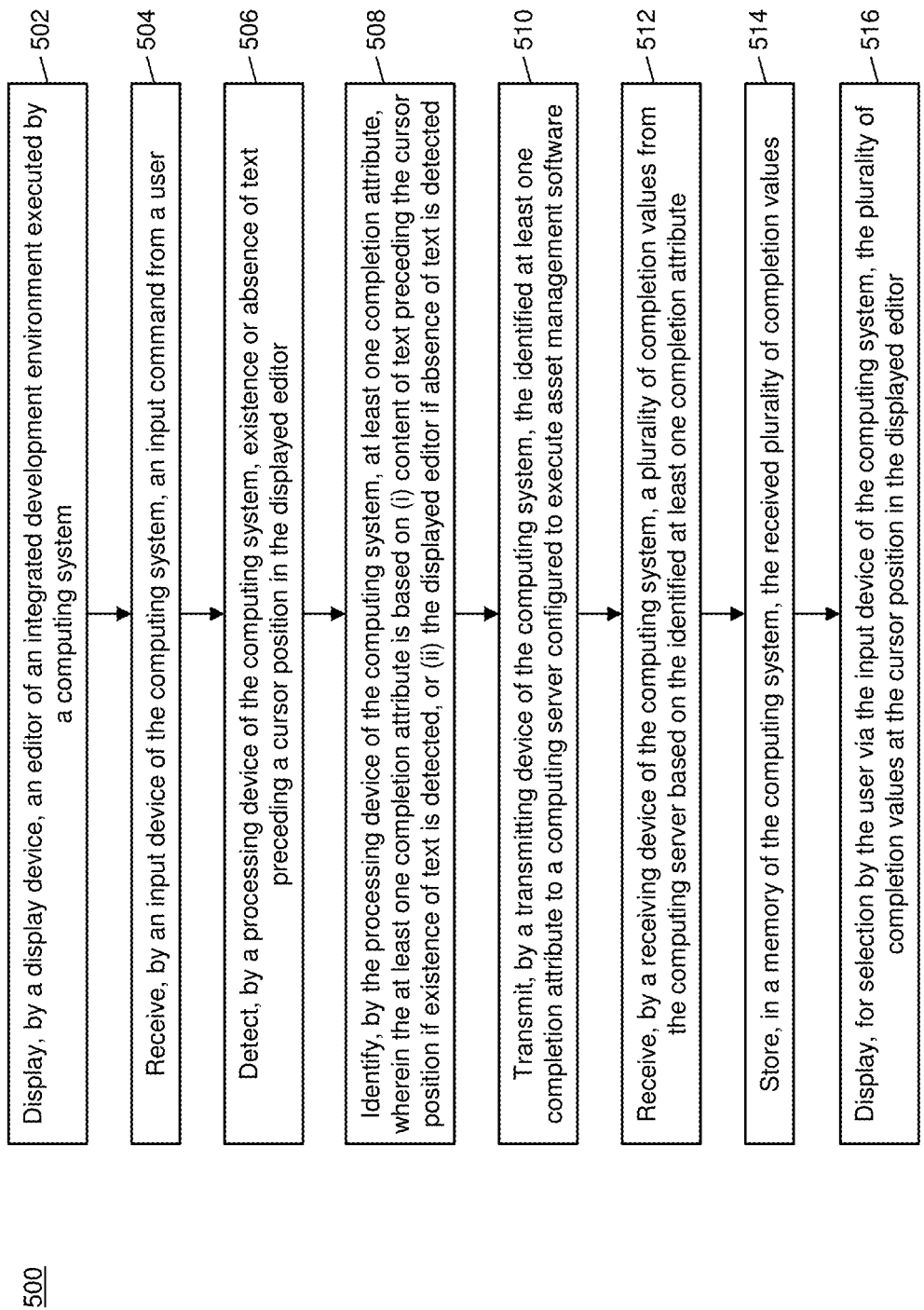
FIG. 5 is flow chart illustrating an exemplary method for the display of context-based completion values in an integrated development environment in accordance with exemplary embodiments.

FIG. 5 illustrates a method 500 for the display of context-based completion values in an integrated development environment based on data stored in an asset database of an asset management server.

In step 502, an editor of an integrated development environment (IDE) executed by a computing system (e.g., the computing device 104) may be displayed by a display device (e.g., the display device 202). In step 504, an input command from a user (e.g., the user 102) may be received by an input device (e.g., the input device 208) of the computing system 104. In step 506, existence or absence of text preceding a cursor position in the displayed editor may be detected by a processing device (e.g., the processing device 212) of the computing system 104. In one embodiment, the detected existence or absence of text preceding the cursor position may be based on the received input command.

In step 508, at least one completion attribute may be identified by the processing device 212 of the computing system 104, wherein the at least one completion attribute is based on (i) content of text preceding the cursor position if existence of the text is detected, or (ii) the displayed editor if absence of text is detected. In one embodiment, the displayed editor may include a script, and the content of text preceding the cursor position may be based on partial execution of the script included in the displayed editor.

In step 510, the identified at least one completion attribute may be transmitted by a transmitting device (e.g., the transmitting device 214) of the computing system 104 to a computing server (e.g., the asset management server 108) configured to execute asset management software.

In step 512, a plurality of completion values may be received by a receiving device (e.g., the receiving device 216) of the computing system 104 from the computing server 108 based on the identified at least one completion attribute. In one embodiment, the plurality of completion values may include at least one of: fields and relationships of a database (e.g., the asset database 110) stored in the computing server 108 and associated with the asset management software executed by the computing server 108. In some embodiments, the plurality of completion values may include at least one of: fields, relationships, attributes, and methods.

In step 514, the received plurality of completion values may be stored in a memory (e.g., the memory 206) of the computing system 104. In one embodiment, the received plurality of completion values stored in the memory 206 of the computing system 104 may be deleted from the memory 206 after a predetermined period of time. In step 516, the plurality of completion values may be displayed for selection by the user 102 via the input device 208 of the computing system 104 at the cursor position in the displayed editor. In some embodiments, the plurality of completion values may be displayed in the displayed editor via an application programming interface (API) of the IDE.

In one embodiment, the method 500 may further include: receiving, by the input device 208 of the computing system 104, a user selection of a specific completion value of the plurality of completion values and displaying, by the display device 202, the specific completion value as inserted text at the cursor position. In some embodiments, attributes and methods associated with at least one of: the displayed editor and text included in the displayed editor may be stored in the memory 206 of the computing system 104. In a further embodiment, the method 500 may further include updating, by the processing device 212 of the computing system 104, the plurality of completion values to include the stored attributes and methods prior to displaying in the displayed editor.

Techniques consistent with the present disclosure provide, among other features, systems and methods for displaying context-based completion values. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method, comprising:
    displaying, by a display device, an editor of an integrated development environment executed by a computing system;
    receiving, by an input device of the computing system, an input command from a user;
    detecting, by a processing device of the computing system, existence or absence of text preceding a cursor position in the displayed editor;
    identifying, by the processing device of the computing system, at least one completion attribute, wherein the at least one completion attribute is based on (i) content of text preceding the cursor position if existence of text is detected, or (ii) the displayed editor if absence of text is detected;
    transmitting, by a transmitting device of the computing system, the identified at least one completion attribute to a computing server configured to execute asset management software;
    receiving, by a receiving device of the computing system, a plurality of completion values from the computing server based on the identified at least one completion attribute;
    storing, in a memory of the computing system, the received plurality of completion values; and
    displaying, for selection by the user via the input device of the computing system, the plurality of completion values at the cursor position in the displayed editor wherein the plurality of completion values includes at least one of: fields and relationships of a database stored in the computing server and associated with the asset management software executed by the computing server.

2. The method of claim 1, further comprising:
    receiving, by the input device of the computing system, a user selection of a specific completion value of the plurality of completion values; and
    displaying, by the display device, the specific completion value as inserted text at the cursor position.

3. The method of claim 1, further comprising:
    storing, in the memory of the computing system, attributes and methods associated with at least one of: the displayed editor and text included in the displayed editor.

4. The method of claim 3, further comprising:
    updating, by the processing device of the computing system, the plurality of completion values to include the stored attributes and methods prior to displaying in the displayed editor.

5. The method of claim 1, wherein the plurality of completion values includes at least one of: fields, relationships, attributes, and methods.

6. The method of claim 1, wherein the detected existence or absence of text preceding the cursor position is based on the received input command.

7. The method of claim 1, wherein the received plurality of completion values stored in the memory of the computing device is deleted from the memory after a predetermined period of time.

8. The method of claim 1, wherein
    the displayed editor includes a script, and
    the content of text preceding the cursor position is based on partial execution of the script included in the displayed editor.

9. The method of claim 1, wherein the plurality of completion values are displayed in the displayed editor via an application programming interface of the integrated development environment.

10. A system, comprising:
    a computing system including
        a display device configured to display an editor of an integrated development environment executed by a computing system;
        an input device configured to receive an input command from a user;
        a processing device configured to detect existence or absence of text preceding a cursor position in the displayed editor, and
        identify at least one completion attribute, wherein the at least one completion attribute is based on (i) content of text preceding the cursor position if existence of text is detected, or (ii) the displayed editor if absence of text is detected;
        a transmitting device configured to transmit the identified at least one completion attribute to a computing server configured to execute asset management software;
        a receiving device configured to receive a plurality of completion values from the computing server based on the identified at least one completion attribute; and
        a memory configured to store the received plurality of completion values, wherein the display device is further configured to display, for selection by the user via the input device of the computing system,
        the plurality of completion values at the cursor position in the displayed editor wherein the plurality of completion values includes at least one of: fields and relationships of a database stored in the computing server and associated with the asset management software executed by the computing server.

11. The system of claim 10, wherein
    the input device is further configured to receive a user selection of a specific completion value of the plurality of completion values, and
    the display device is further configured to display the specific completion value as inserted text at the cursor position.

12. The system of claim 10, wherein the memory is further configured to store attributes and methods associated with at least one of: the displayed editor and text included in the displayed editor.

13. The system of claim 12, wherein the processing device is further configured to update the plurality of completion values to include the stored attributes and methods prior to displaying in the displayed editor.

14. The system of claim 10, wherein the plurality of completion values includes at least one of: fields, relationships, attributes, and methods.

15. The system of claim 10, wherein the detected existence or absence of text preceding the cursor position is based on the received input command.

16. The system of claim 10, wherein the received plurality of completion values stored in the memory of the computing device is deleted from the memory after a predetermined period of time.

17. The system of claim 10, wherein
the displayed editor includes a script, and
the content of text preceding the cursor position is based on partial execution of the script included in the displayed editor.

18. The system of claim 10, wherein the plurality of completion values are displayed in the displayed editor via an application programming interface of the integrated development environment.

\* \* \* \* \*